United States Patent
Mast et al.

(10) Patent No.: US 7,241,089 B2
(45) Date of Patent: Jul. 10, 2007

(54) DRILL INSERT HAVING CURVED CUTTING EDGES

(75) Inventors: Wendell E. Mast, Dundee, OH (US); Joseph P. Nuzzi, Dover, OH (US)

(73) Assignee: Allied Machine & Engineering Corp., Dover, OH (US)

(*) Notice: Subject to any disclaimer, the term of this patent is extended or adjusted under 35 U.S.C. 154(b) by 0 days.

(21) Appl. No.: 11/276,864

(22) Filed: Mar. 17, 2006

(65) Prior Publication Data
US 2006/0159534 A1   Jul. 20, 2006

Related U.S. Application Data

(63) Continuation of application No. 10/780,133, filed on Feb. 17, 2004, now Pat. No. 7,018,145.

(60) Provisional application No. 60/518,556, filed on Nov. 7, 2003.

(51) Int. Cl.
*B23B 51/02* (2006.01)
(52) U.S. Cl. .................... 408/233; 408/227; 408/713
(58) Field of Classification Search ............. 408/227, 408/144, 230, 231, 233, 713
See application file for complete search history.

(56) References Cited

U.S. PATENT DOCUMENTS

| | | | |
|---|---|---|---|
| 1,047,466 A * | 12/1912 | Wagner | 408/224 |
| 1,221,247 A | 4/1917 | Traylor | |
| 2,966,081 A * | 12/1960 | Kallio | 408/230 |
| 3,076,357 A * | 2/1963 | Benjamin et al. | 408/211 |
| 3,199,381 A * | 8/1965 | Mackey | 408/226 |
| 4,060,335 A | 11/1977 | Holloway et al. | |
| 4,115,024 A | 9/1978 | Süssmuth | |
| 5,423,640 A | 6/1995 | Lindblom et al. | |
| 5,474,407 A | 12/1995 | Rodel et al. | |
| 5,599,145 A | 2/1997 | Reinauer et al. | |
| 5,609,447 A * | 3/1997 | Britzke et al. | 408/230 |
| 5,904,455 A | 5/1999 | Krenzer et al. | |
| 5,957,631 A | 9/1999 | Hecht | |
| 5,971,673 A | 10/1999 | Berglund et al. | |
| 5,988,953 A | 11/1999 | Berglund et al. | |
| 6,012,881 A | 1/2000 | Scheer | |
| 6,135,681 A * | 10/2000 | Nuzzi et al. | 408/227 |
| 6,371,702 B1 | 4/2002 | DeWald, Jr. et al. | |
| 6,481,938 B2 | 11/2002 | Widin | |
| 6,514,019 B1 | 2/2003 | Schulz | |
| 6,551,036 B2 | 4/2003 | Heule | |
| 6,585,460 B1 | 7/2003 | Meece et al. | |
| 6,676,342 B2 * | 1/2004 | Mast et al. | 408/144 |
| 6,685,402 B2 | 2/2004 | Mast et al. | |

(Continued)

FOREIGN PATENT DOCUMENTS

DE    42 39 311 A1    5/1994

(Continued)

*Primary Examiner*—Daniel W. Howell
(74) *Attorney, Agent, or Firm*—Hahn Loeser + Parks LLP (57) ABSTRACT

A spade drill insert and drilling tool assembly is provided wherein the spade drill insert body comprises curved cutting edges and a lip groove having a trough substantially parallel to a plane formed through each adjacent curved cutting edge, which provides a significant improvement in chip formation during cutting operations.

20 Claims, 7 Drawing Sheets

U.S. PATENT DOCUMENTS

| | | | |
|---|---|---|---|
| 7,011,478 B2 * | 3/2006 | Stokey et al. | 408/227 |
| 7,018,145 B2 | 3/2006 | Mast et al. | |
| 2004/0001741 A1 * | 1/2004 | Mast et al. | 408/233 |
| 2005/0135888 A1 * | 6/2005 | Stokey et al. | 408/230 |

FOREIGN PATENT DOCUMENTS

| | | | |
|---|---|---|---|
| DE | 19736598 A1 | | 3/1999 |
| EP | 0 589 858 A1 | | 3/1994 |
| GB | 550306 | | 1/1943 |
| JP | 01045504 A | * | 2/1989 |
| JP | 10109210 A | * | 4/1998 |
| JP | 10328918 A | * | 12/1998 |
| JP | 11129109 A | * | 5/1999 |
| WO | WO 00/07761 A1 | | 2/2000 |

\* cited by examiner

DRILL INSERT HAVING CURVED CUTTING EDGES

This application is a continuation of U.S. non-provisional patent application Ser. No. 10/780,133, filed Feb. 17, 2004, now issued as U.S. Pat. No. 7,018,145, which claimed the benefit of U.S. provisional patent application Ser. No. 60/518,556, filed Nov. 7, 2003, both applications hereby incorporated by reference.

TECHNICAL FIELD

The invention relates generally to a spade drill insert to be placed into a tool holder for boring holes into metals. More specifically, the invention relates to a spade drill insert having curved cutting edges which provide a significant improvement in chip formation over existing prior art spade drill inserts.

BACKGROUND OF THE INVENTION

Drilling systems are frequently used to provide cylindrical holes in metallic workpieces. The cutting or boring action of the drill system may be carried out by an elongated, substantially cylindrical drilling tool, such as a combination of a tool holder and a spade drill insert, which is selectively attached thereto. Such an arrangement may then be used in an application wherein one end of the tool holder is securely mounted in a driving apparatus, which rotates the holder about its longitudinal axis. At the opposite end of the elongated tool holder, the cutting insert engages the material to be cut. Alternatively, the workpiece may be made to rotate relative to the holder and cutting insert, such as in positioning the holder in the tail stock of a lathe or the like. Further, the tool and workpiece may be made to rotate relative to one another. The use of spade drill cutting inserts allows for quick changing of the insert upon wear of the cutting surfaces instead of the entire tool, and allows for one tool to be used for a variety of different boring applications by simply changing the insert and not the entire drill assembly.

Spade drill inserts are characterized in that they are generally flat having a pair of connection surfaces or faces on opposite sides of the insert that are parallel to each other and provide a register surface for the clamping arms of the holder. The leading end of the spade drill typically has a pair of straight, transverse cutting edges in the form of an obtuse V. The trailing end or base of the spade drill insert is typically planar and perpendicular to the pair of connection surfaces and engages the bottom of the holder slot. The sides across the width of the insert provide the margin and a clearance for the insert. The margin is cylindrically formed about the rotational axis of the spade drill and contacts the side of the hole during drilling operations.

One problem with prior art spade drill inserts is that the straight cutting edges do not efficiently form and/or transport chips during drilling operations. With the prior art spade drills, the chips are formed radially outward toward the outside diameter of the insert due to their straight cutting edge. Another problem with prior art inserts utilizing a corner clip clearance, the furthermost outside cutting edge is closer to the centerline of the lip thus being closer to a neutral or less positive rake geometry, especially when an oversized corner clip is utilized. This results in less efficient cutting at the outside diameter of the spade drill insert. A further problem with the prior art inserts is that the straight cutting edge chip formation is not tight which requires that the operational ranges of the tool to be narrowly defined for proper tool operation. In addition, the geometry of the straight cutting edges of prior art spade drills are apt to be susceptible to chatter primarily due to the chip formation energy along rotating symmetrical planes at a constant speed developing harmonics at various operating speeds depending on the material being cut and the natural frequency of the tool and system. This may result in the operator having to change the operating conditions of the drilling procedure to less than optimal ranges.

SUMMARY OF THE INVENTION

The spade drill of the present invention provides improved chip formation. This and other advantages over the prior art are provided by a drill insert comprising a drill insert body having a first end opposite a second end, a first face side opposite and parallel to a second face side, and a first land side opposite a second land side, the first and second land sides formed between the ends and the face sides; wherein the second end comprises at least two cutting edges formed transverse to each other, wherein each cutting edge is curved; and a groove formed in each cutting face adjacent the cutting edge, the groove having a trough substantially parallel to a plane formed through the abutting edges.

This and other advantages over the prior art are also provided by a drilling tool assembly comprising a holder having a first end and a second end, wherein the second end comprises a shank portion adapted to be fixedly attached in a drilling machine, wherein the first end comprises a holder slot having a bottom seating surface over at least a portion of the holder slot and at least one attachment arm positioned on each side of the holder slot, wherein each attachment arm has at least one aperture formed therein; and a drill insert comprising a drill insert body having a first end opposite a second end, a first face side opposite a second face side and a first land side opposite a second land side, the first and second land sides formed between the ends and the face sides, wherein the first end of the drill body is a generally planar surface, wherein the second end comprises at least two cutting edges formed transverse to each other, wherein each of the at least two cutting edges is curved, at least two apertures formed through each face side of the drill insert body, and a groove formed in each face side of the drill insert body adjacent the cutting edge, the groove having a trough substantially parallel to the cutting edges.

These and other advantages of the invention will be apparent as described below and in relation to the drawings.

BRIEF DESCRIPTION OF THE DRAWINGS

The invention and developments thereof are described in more detail in the following by way of embodiments with reference to the drawings, in which.

DETAILED DESCRIPTION OF THE INVENTION

Figure 1:
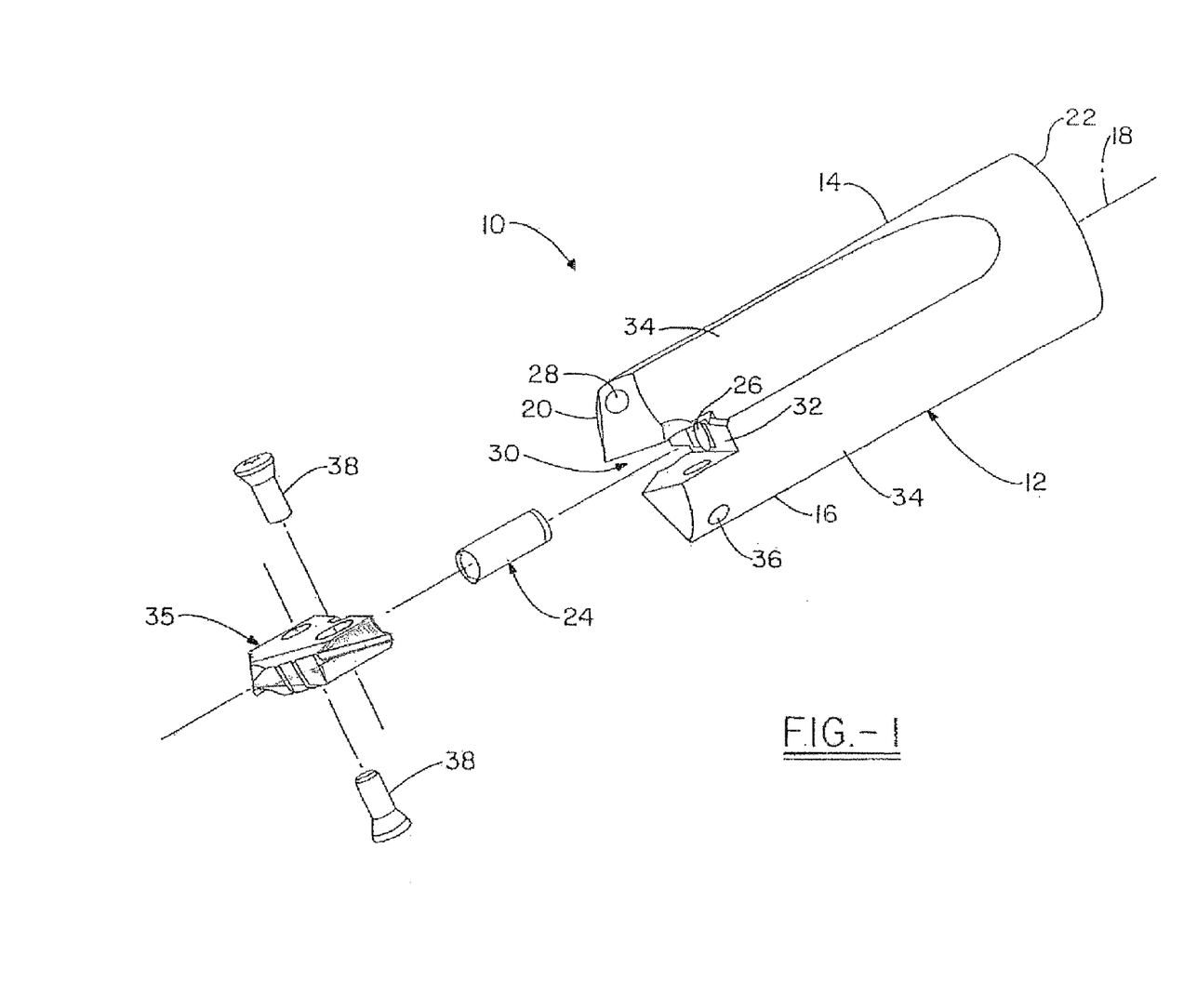
FIG. 1 is an exploded assembly view of the drill tool assembly according to a preferred embodiment.
Figure 2:
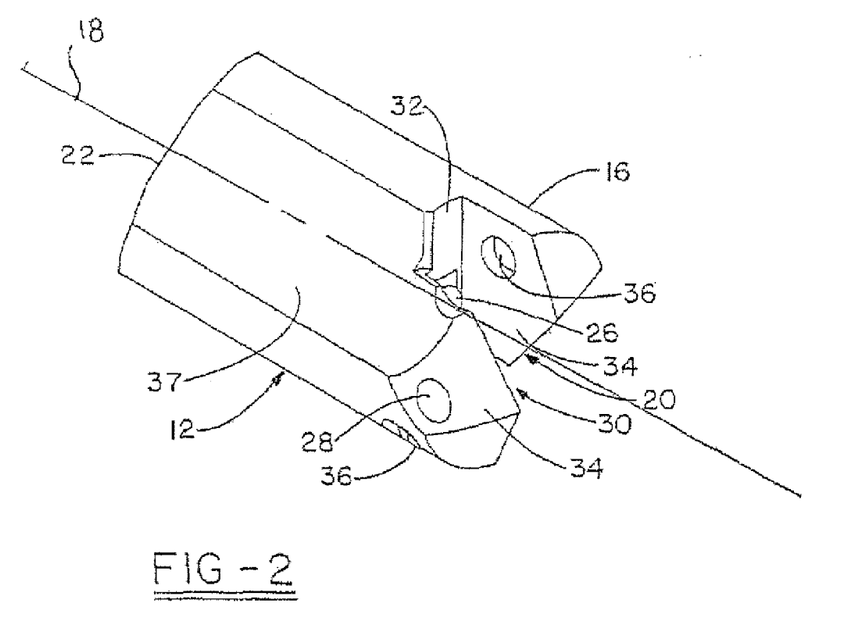
FIG. 2 is a partial perspective view of the holder associated with the assembly.

Turning now to a preferred embodiment of the invention, FIG. 1 illustrates a drill tool assembly 10 generally indicated. Drill tool assembly 10 comprises a holder 12, which has a body 14 and head portion 16 associated therewith. In the preferred embodiment, holder 12 has, in general, a cylindrical shape with a first end 20 and second end 22. As shown in FIG. 2, the first end 20 of holder 12 has a clamping or holder slot 30, which may extend across the entire diameter of the head portion 16 or, at least, over a center portion thereof at the general location of the rotational axis 18 of holder 12. The holder slot 30 has a bottom wall 32 positioned in substantially perpendicular orientation relative to the rotational axis 18 of the holder 12. In the preferred embodiment, the assembly 10 may further include a locating boss or dowel pin 24, which is positioned precisely with respect to the axis 18 and extends from the bottom wall 32 of the holder slot 30. The pin 24 may be positioned within a hole 26 extending downwardly from the bottom wall 32 of slot 30 along the axis 18 of the holder body in a press fit relationship to position pin 24. Alternatively, the locating boss, which, in the preferred embodiment, comprises pin 24, may be configured in another manner to achieve the corresponding functionality of pin 24, such as an integral member extending from bottom wall 32. Within the holder slot 30, a drill insert 35 is precisely positioned with respect to the holder 12 to perform the desired drilling function in conjunction therewith. As will be hereinafter described in more detail, the insert 35 has a point geometry comprising a plurality of cutting surfaces, which are precisely positioned with respect to the axis 18 of the holder 12 to minimize errors in a resulting drilling operation using assembly 10.

More particularly, the preferred embodiment of holder 12 is shown in FIG. 2, and may be configured to include at its first end 20 a pair of clamping arms 34, which extend about holder slot 30. The clamping arms 34 preferably include apertures 36, which accommodate screws 38 (see FIG. 1) to secure the drill insert 35 in its position within the holder slot 30. In the preferred configuration, the holes 36 are threaded to engage screws 38, and mate with screw holes formed in the drill insert 35 in a predetermined manner to precisely locate the drill insert in a predetermined location within holder slot 30, as will be described in more detail. Each of the clamp arms 34 may also include a lubrication vent 28, which allows the application and flow of lubrication adjacent the cutting surfaces of the drill insert to facilitate the drilling operation. The clamp arms 34 may also include angled or curved surfaces, which facilitate chip removal via chip evacuating grooves 37 on each side of the holder 12. The seating surface 32 is also shown to be designed as a planar surface, which corresponds to the planar bottom portion of the preferred drill insert 35, although another configuration of bottom surface 32 may be employed and is contemplated herein. It is contemplated that the drill insert 35 is made of a sintered metallic hard material such as carbide, cermet, ceramic, monocrystalline and polycrystalline diamond, or boron nitride. However, the drill insert 35 may also be comprised of high speed steel.

Turning to FIGS. 3A–3G, a first embodiment of the spade drill insert 35 is shown. The drill insert 35 comprises cutting edges 64 on its upper surface generally in the form of an obtuse V-shape, with a cutting edge 64 on each either side of the chisel 62 and radially outward from a web thin 63. Each cutting edge 64 is curved and formed in a cutting edge plane such that the planes formed through the cutting edges 64 are transverse to each other and form the included angle. The cutting edges 64 are curved in the direction of rotation.

The curved cutting edges 64 may include a plurality of cutting components such as chip breakers 66, which cooperate together to provide the desired cutting surface for the material and/or drilling application. The insert 35 further comprises a pair of connection surfaces 68, or faces, on opposite sides of the insert 35 that are parallel to each other and provide a register surface for the clamping arms 34 of the holder 12. A groove 65, also referred to as the lip, is formed in each connection surface 68 adjacent the cutting edge 64 and having a trough generally parallel to the associated cutting edge plane. Groove 65, in combination with the curved cutting edges 64, provides a positive axial and radial rake angle and aids in chip formation. The trough of the groove 65 may be curved or linear. When the trough is linear, the groove 65 will be parallel to the cutting plane—however, the linear groove may have an adverse effect on the strength of the cutting edge with cutting edges extending beyond the plane of the associated face side of the drill body as well as providing less of a radial rake angle along the cutting edge 64. These problems can be minimized by slightly skewing the groove such that the groove depth decreases as it extends radially outward. When the trough is curved, the groove 65 may be generally parallel to the cutting edge 64. Whether the trough is curved, skewed, or linear, the trough of the groove 65 is considered to be substantially parallel to a plane formed through the adjacent cutting edge.

Figure 3A:
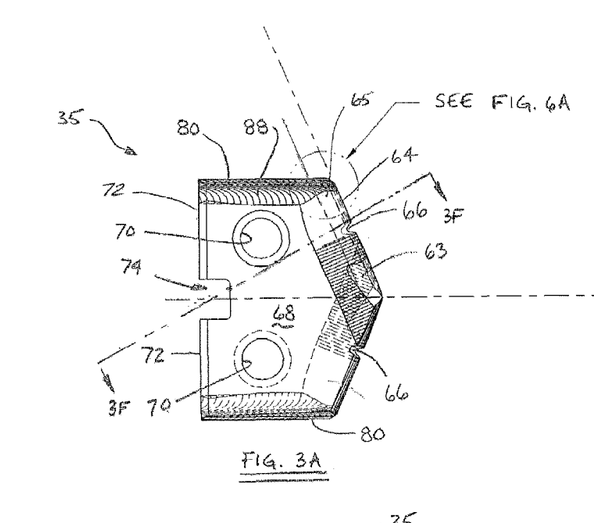
FIG. 3A is a front elevational view of an insert according to a first embodiment of the present invention having curved cutting edges.
Figure 3B:
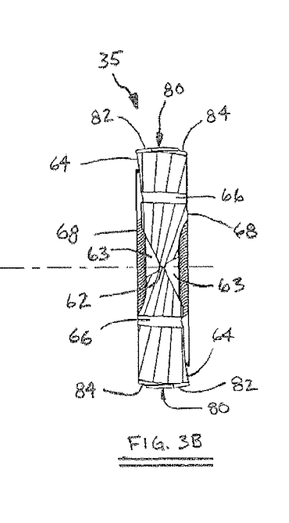
FIG. 3B is a leading end view of the insert of FIG. 3A.
Figures 3C, 3E:
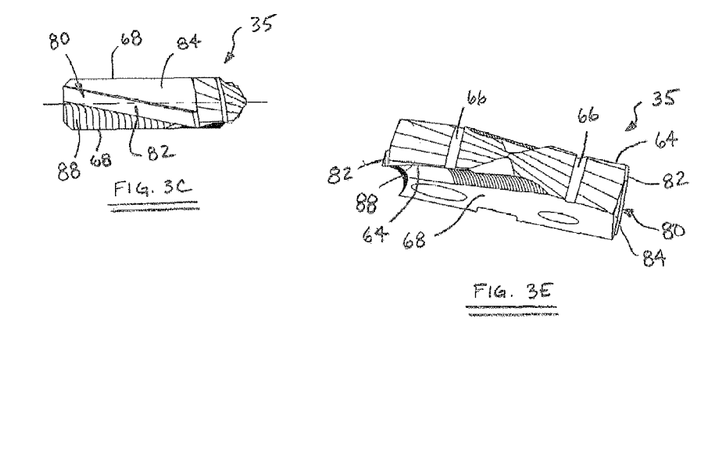
FIG. 3C is a side elevational view of the insert of FIG. 3A.
FIG. 3E is a perspective view of the leading end of the insert of FIG. 3A.
Figure 3D:
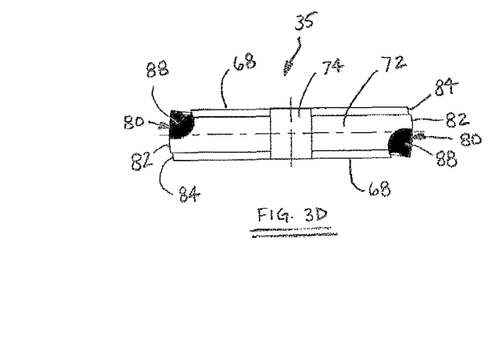
FIG. 3D is a trailing end view of the insert of FIG. 3A.

The bottom 72 of the insert 35 is generally planar and perpendicular to connection surfaces 68. Bottom 72 also may include positioning slot 74 which cooperates with the pin 24 of the holder 12. The drill insert 35 may further comprise apertures 70 through connection surfaces 68, which cooperate with the apertures 36 in clamp arms 34 to secure insert 35 within holder slot 30 and seated against seating surface 32. Additionally, each of the apertures 36 and 70 are preferably formed with countersunk portions formed as a bearing surface adapted to be engaged by a corresponding tapered or like surface on the screws or other fastening mechanism 38. The enlarged clamping head of the screws 38 may be of any convenient shape, such as conical, ball-shaped, or in another form to correspond with the similar surfaces in the tool holder 12 and insert 35. In a typical fashion, by offsetting the axes of the apertures 36 and 70, upon securing insert 35 within slot 30 by means of screws 38, the insert 35 will be forced downwardly against the seating surface 32.

The drill insert 35 further comprises lands or sides 80 across the width of the insert 35, each side 80 comprising a margin 82, a radially inward positioned clearance surface 84 on the trailing end of side 80, and a helical flute or gullet 88 adjacent the margin 82 on the leading side 80 of the insert 35. Margin 82 may be a parallel helical margin that provides a constant margin width that is maintained from the cutting edge on one side of the insert 35 to the back location on the other side of the insert 35 as best shown in FIG. 3C. The margin surface 82 is cylindrically formed about the rotational axis 18 of the insert 35 and contacts the edges of the hole being drilled. The helical margin 82 also results in almost the entire radial width of the side 80 to be able to contact with the hole as best shown in the top view of FIG. 3B. Therefore the drill insert 35 provides increased stability over that of prior art spade drill inserts. In addition, the margin width can be decreased from the prior art, which will decrease the amount of heat generated due to friction at the sides 80 of the insert which may further increase tool life and/or allow the tool to be run at a higher speed while maintaining tool life.

Insert 35 comprises helical flute or gullet 88 adjacent the margin 82 and positioned helically on the leading corner of the spade drill insert 35. The gullet 88 may help channel chips out of the hole and may also help in chip formation. In addition, the gullet 88 will prevent chips from being trapped on the leading edge side of the margin 82. As previously mentioned, with prior art inserts utilizing a corner clip clearance, the furthermost outside cutting edge is closer to the centerline of the lip thus being closer to a neutral or less positive rake geometry, especially when an oversized corner clip is utilized. In the present invention, the gullet 88 extents upward through the lip such that the furthermost outside cutting edge of the insert 35 retains a more positive rake angle geometry. This enables the spade drill insert 35 to cut more efficiently than prior art spade drill inserts.

The cutting edges 64 are curved such that the cutting edges 64 have a positive radial rake angle in addition to a positive axial rake angle. The curved cutting edges 64 result in the chips being formed directed toward the center of the insert 35 resulting in tighter chip formation. With this improvement in chip formation, the drill insert 35 will be able to run at higher speeds (SFM) while maintaining chip formation in an elastic steel application, thus increasing penetration rates. The curved cutting edges 64 also allow the drill insert to maintain chip formation at broader range of speeds and feeds and thus become more versatile to adapt to problematic machining environments such as machines with limited thrust abilities. Another advantage of the curved cutting edge is that it helps reduce chatter by canceling out some of the harmonic modes associated with prior art spade drill inserts having straight cutting edges.

Figure 3F:
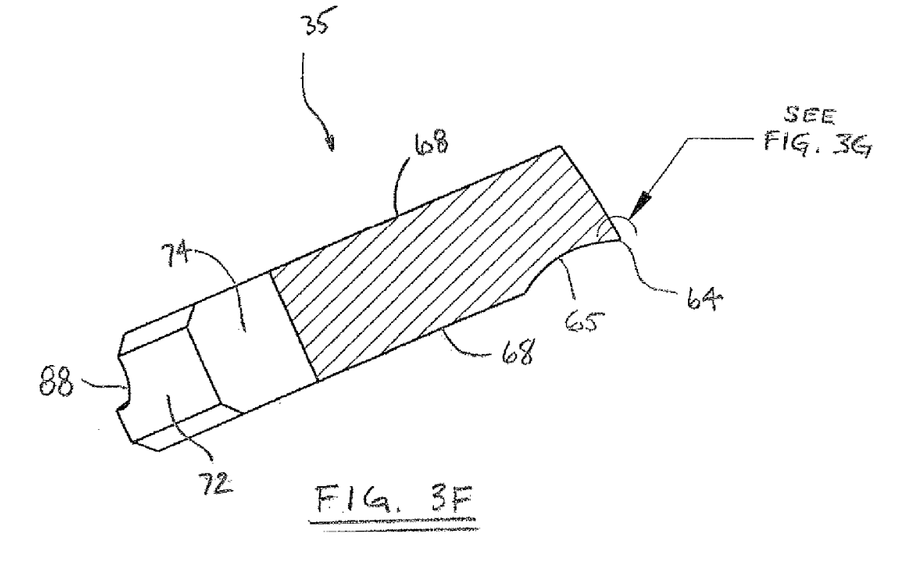
FIG. 3F is a cross-sectional view of the insert of FIG. 3A taken along line 3F—3F.
Figure 3G:
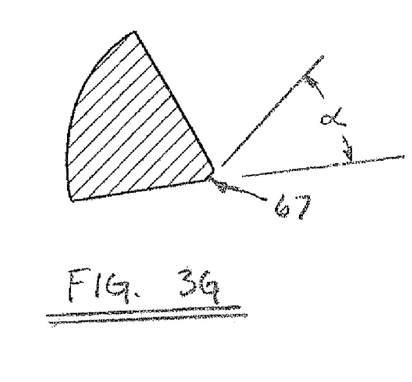
FIG. 3G is a detailed cross-sectional view of the cutting edge as shown in FIG. 3F.
Figure 4A:
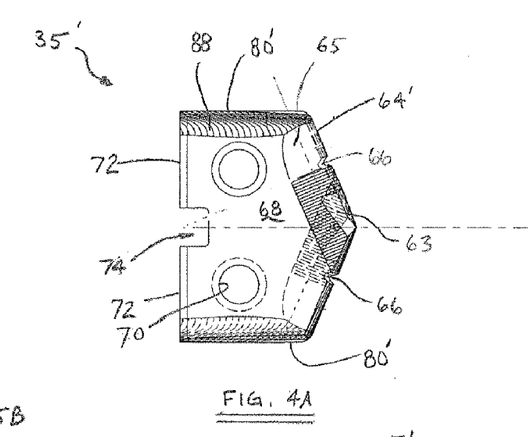
FIG. 4A is a front elevational view of an insert according to a second embodiment of the present invention having a curved cutting edges of greater magnitude than the cutting edges of the first embodiment.
Figure 4B:
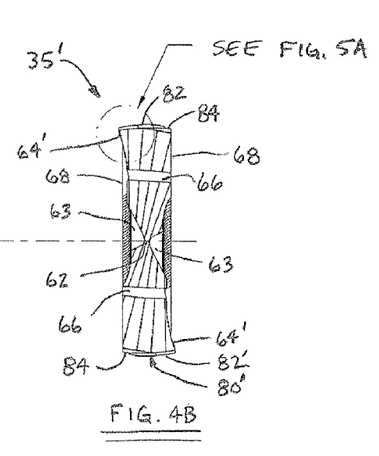
FIG. 4B is a leading end view of the insert of FIG. 4A.
Figures 4C, 4D:
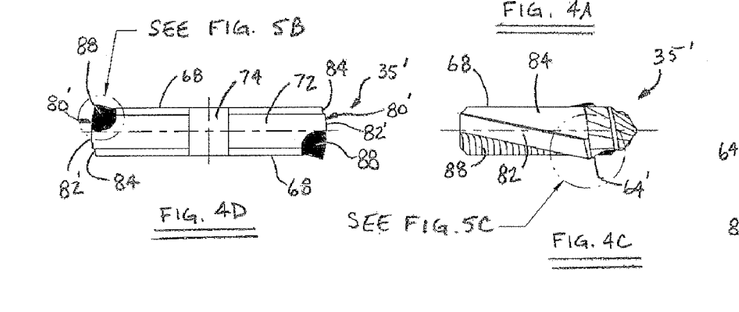
FIG. 4C is a side elevational view of the insert of FIG. 4A.
FIG. 4D is a trailing end view of the insert of FIG. 4A.
Figure 4E:
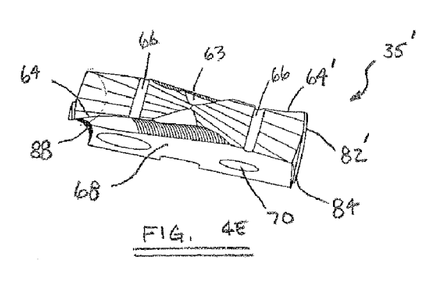
FIG. 4E is a perspective view of the leading end of the insert of FIG. 4A.

The curved cutting edges 64 can also be utilized with a cutting edge treatment as best shown in FIGS. 3F–3G, which show a cross-sectional view of insert 35 and a partial detail view of a cutting edge treatment 67, in the form of a K-land formed at an angle α, applied to the curved cutting edge, respectively. It is contemplated that other edge treatments may also be utilized in conjunction with the curved cutting edges such as a T-land, a hone, etc.

Referring now to FIGS. 4A–4E, a second embodiment of the spade drill insert 35' is shown having curved cutting edges 64' with an increased radial rake angle. The increased curvature allows for more variation in rake angle for different geometries.

Figure 5A:
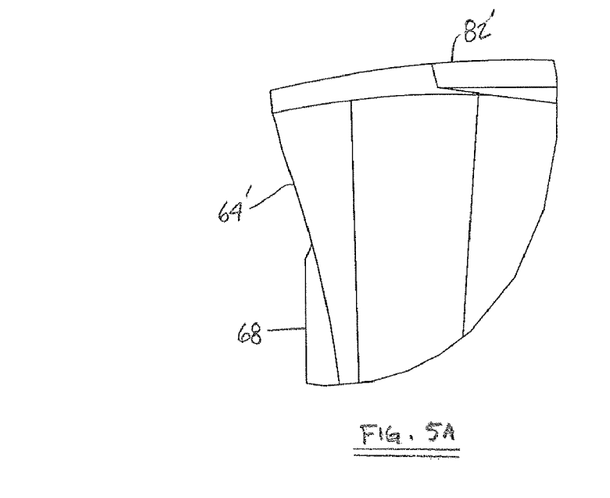
FIG. 5A is a detail view of a portion of the leading end view of FIG. 4B showing a curved cutting edge and associated features of the embodiment of FIGS. 4A–4E.
Figure 5B:
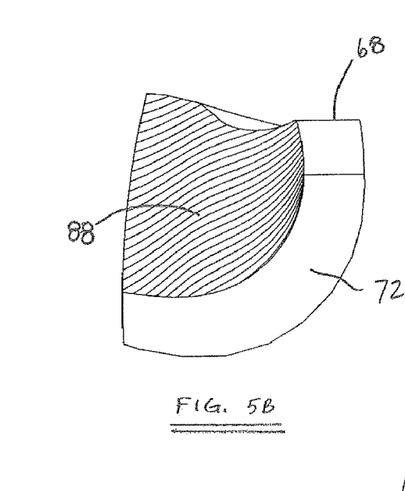
FIG. 5B is a detail view of a portion of the side elevational view of FIG. 4C.
Figure 5C:
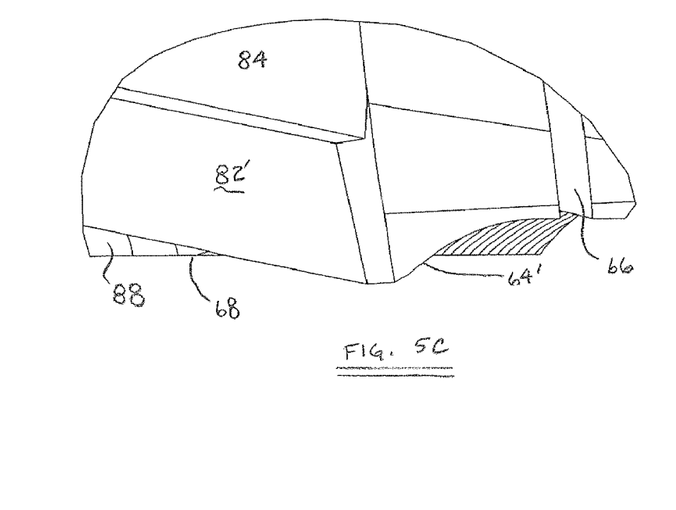
FIG. 5C is a detail view of a portion of the trailing end view of FIG. 4D.

In the previous embodiment, the curved cutting edge 64' did not extend beyond an extended plane of the connection surface 68 of the insert 35. As best shown in FIGS. 5A–5C, the increased radial rake curved cutting edge 64' of the insert 35' extends well beyond the extended plane of the connection surface 68 of the insert 35'. This feature allows a longer cutting edge for the same diameter hole which helps increase cutting efficiency and prolongs the life of the cutting edge by spreading out the work along a longer cutting edge. The extended curved cutting edge also helps further reduce chatter by canceling out more harmonics associated with the drilling operation. Another benefit of the feature is that the parallel helical margin 82' is adjacent the end of the cutting edge 64' and is therefore extended radially beyond the plane of the connection surface 68 of the insert 35'. This provides addition contact between the hole and the margin 82', resulting in increased stability of the insert 35'.

Figure 6A:
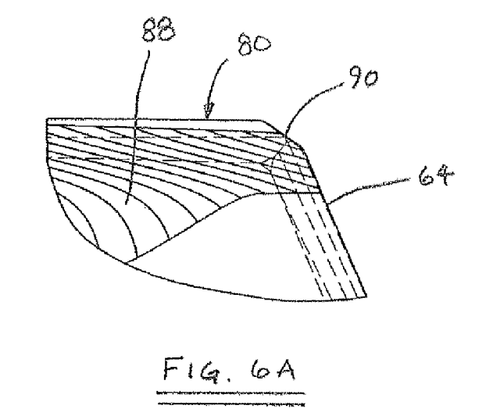
FIGS. 6A–6B are a partial plan view and a partial top view, respectively of a cam ground corner edge clearance associated with the present invention.
Figure 6B:
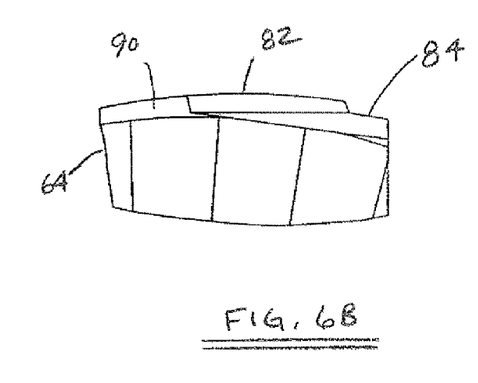
Figure 7A:
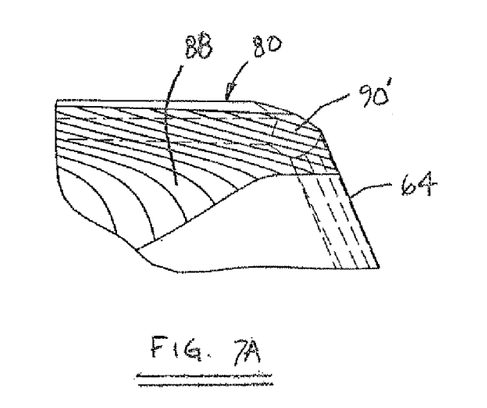
FIGS. 7A–7B are a partial plan view and a partial top view, respectively of a corner clip corner edge clearance associated with the present invention.
Figure 7B:
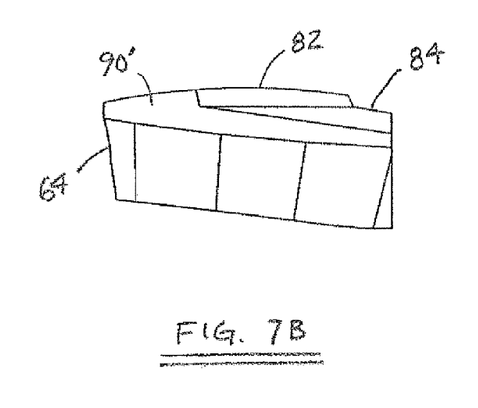

It is contemplated that the curved cutting edges in conjunction with a flat style spade drill insert is not limited to the features shown on the spade drill inserts herein and that the curved cutting edge configuration may be used in conjunction with other specific types of spade drill insert geometries. Accordingly, the curved cutting edge feature may be independent of the specific types of webs, lips, point clearances, corner clips, corner radii, etc., which may vary between different flat style spade drill inserts. For example, as shown in FIGS. 6A–7B, different types of corner treatments may be associated in a spade drill insert without limiting the curved cutting edges. In FIG. 6A a partial plan view of the insert corner, and in FIG. 6B a partial top view of the insert corner, combine to show a cam ground corner clearance 90 on an insert having curved cutting edges. In FIG. 7A a partial plan view of the insert corner, and in FIG. 7B a partial top view of the insert corner, combine to show a second alternate corner clearance 90' on an insert having curved cutting edges.

While the above description has been presented with specific relation to particular embodiments of the invention, it is to be understood that the claimed invention is not to be limited as such and that certain changes may be made without departing from the scope of the invention with the above description intended to be interpreted as illustrative and not limiting.

What is claimed is:

1. A drill insert comprising:
    a drill insert body having a first end opposite a second end, a first face side opposite and parallel to a second face side, and a first land side opposite a second land side, the first and second land sides formed between the ends and the face sides;
    wherein the second end comprises at least two cutting edges formed transverse to each other, wherein at least a portion of each cutting edge is curved; and
    a groove formed in each face side adjacent the cutting edge, the groove having a trough substantially parallel to the adjacent curved cutting edge, wherein the depth of the groove decreases, in a direction away from a center of the drill insert body and toward one of the land sides of the drill insert body, at the portion of each cutting edge that is curved.

2. The drill insert of claim 1, wherein the cutting edges have a positive radial rake angle.

3. The drill insert of claim 1, wherein the cutting edges have a positive axial rake angle.

4. The drill insert of claim 1, wherein the trough of the groove is formed in a straight line.

5. The drill insert of claim 1, wherein the cutting edges have a cutting edge treatment applied thereto selected from the group consisting of a K-land, a T-land, and a hone.

6. The drill insert of claim 1, wherein at least a portion of each curved cutting edge extends beyond the plane of the corresponding face side of the drill insert body.

7. The drill insert of claim 1, wherein each land has a margin formed with a constant arcuate width between the leading side and the trailing side such that both the leading side and the trailing side are formed as a helix.

8. The drill insert of claim 1, wherein each land has a margin and the leading side of each margin is formed as a helix and wherein a helical flute is formed adjacent the leading side of each margin.

9. The drill insert of claim 8, wherein at least two apertures are formed through each face side of the drill insert body, and
wherein the helical flutes are formed radially outward of the apertures.

10. The drill insert of claim 9, wherein the helical flutes intersect with the groove on each face side of the drill body.

11. The drill insert of claim 1, wherein the first end of the drill body is a generally planar surface having at least one recess formed therein.

12. The drill insert of claim 1 further comprises a chip breaker formed through each cutting edge.

13. The drill insert of claim 1, wherein the drill insert body is comprised of a sintered metallic hard material.

14. The drill insert of claim 1, wherein the drill insert body is comprised of a material selected from the group consisting of carbide, cermet, ceramic, monocrystalline and polycrystalline diamond, boron nitride, and high speed steel.

15. A drill insert comprising:
a drill insert body having a first end opposite a second end, a first face side opposite and parallel to a second face side, and a first land side opposite a second land side, the first and second land sides formed between the ends and the face sides;
a groove formed in each face side of the drill insert body adjacent to and parallel to at least a portion of the second end; and
wherein the depth of the groove decreases, in a direction away from a center of the drill insert body and toward one of the land sides of the drill insert body, along at least a portion of each groove.

16. A drilling tool assembly comprising:
a holder having a first end and a second end, wherein the second end comprises a shank portion adapted to be fixedly attached in a drilling machine, wherein the first end comprises a holder slot having a bottom seating surface over at least a portion of the holder slot and at least one attachment arm positioned on each side of the holder slot, wherein each attachment arm has at least one aperture formed therein; and
a drill insert comprising a drill insert body having a first end opposite a second end, a first face side opposite and parallel to a second face side, and a first land side opposite a second land side, the first and second land sides formed between the ends and the face sides, wherein the second end comprises at least two cutting edges formed transverse to each other, wherein at least a portion of each cutting edge is curved, and a groove formed in each face side adjacent the cutting edge, the groove having a trough substantially parallel to the adjacent curved cutting edge, wherein the depth of the groove decreases, in a direction away from a center of the drill insert body and toward one of the land sides of the drill insert body, at the portion of each cutting edge that is curved.

17. The drilling tool assembly of claim 16, wherein the holder slot includes a locating boss extending from the bottom seating surface and the first end of the drill insert body has at least one recess which cooperates with the locating boss of the bottom seating surface to allow the insert to be seated against the bottom seating surface.

18. The drilling tool assembly of claim 16, wherein the holder includes at least one flushing channel.

19. The drilling tool assembly according to claim 16, wherein a fastening mechanism engages each aperture of the at least two apertures of the drill insert and a corresponding aperture of the at least one aperture in each clamp arm for securing the drill insert in position within the holder slot.

20. The drilling tool assembly according to claim 19, wherein the at least one aperture in each clamp arm is offset from the corresponding aperture in the drill insert at least to urge the drill insert against the bottom seating surface of said holder slot.

* * * * *